United States Patent [19]

Hess et al.

[11] Patent Number: 4,534,534

[45] Date of Patent: Aug. 13, 1985

[54] FASTENING ARRANGEMENT FOR A MOTOR VEHICLE SEAT INCLUDING A SEAT ADJUSTING DEVICE

[75] Inventors: Peter Hess; Volkmar Schülz, both of Coburg; Hans Rampel, Ahorn, all of Fed. Rep. of Germany

[73] Assignee: Metallwerk Max Brose GmbH & Co., Coburg, Fed. Rep. of Germany

[21] Appl. No.: 462,457

[22] Filed: Jan. 31, 1983

Related U.S. Application Data

[63] Continuation of Ser. No. 140,614, Apr. 15, 1980.

[30] Foreign Application Priority Data

Apr. 24, 1979 [DE] Fed. Rep. of Germany ....... 2916562

[51] Int. Cl.³ ............................................. F16M 13/00
[52] U.S. Cl. .................................... 248/424; 248/429
[58] Field of Search ............... 248/424, 394, 430, 503, 248/503.1, 501, 502, 500, 429; 297/331, 335, 339

[56] References Cited

U.S. PATENT DOCUMENTS

| 53,415 | 3/1866 | Cole ................................. 248/501 |
| 1,605,945 | 11/1926 | Hathorne ....................... 248/502 |
| 1,799,871 | 4/1931 | Seaman .......................... 248/430 |
| 2,240,143 | 4/1941 | Lusting .......................... 248/394 |
| 2,277,927 | 3/1942 | McGregor ...................... 248/430 |
| 2,331,060 | 10/1943 | Turner ............................ 248/500 |
| 3,035,806 | 5/1962 | Hamer et al. .................. 248/503 |
| 3,059,964 | 10/1962 | Hoppe et al. .................. 297/331 |
| 3,410,600 | 11/1968 | Thorpe ........................... 297/379 |
| 3,756,094 | 9/1973 | Mauron .......................... 248/429 |
| 3,915,493 | 10/1975 | Brown ............................ 248/501 |
| 3,981,473 | 9/1976 | Nagai ............................. 248/430 |
| 4,015,812 | 4/1977 | Heesch .......................... 248/394 |
| 4,067,611 | 1/1978 | Korozu et al. ................ 297/379 |
| 4,325,527 | 4/1982 | Berneking ..................... 248/394 |
| 4,440,442 | 4/1984 | Drouillard et al. ........... 248/430 |

FOREIGN PATENT DOCUMENTS

2753307 5/1979 Fed. Rep. of Germany ... 248/503.1
0593566 10/1947 United Kingdom ................ 248/394

Primary Examiner—William H. Schultz
Assistant Examiner—Ramon O. Ramirez
Attorney, Agent, or Firm—Toren, McGeady, Stanger, Goldberg & Kiel

[57] ABSTRACT

A mounting arrangement for a vehicle seat assembly including an electrically operated seat adjusting device which permits expedient fastening of the seat assembly to a vehicle floor and which essentially consists of lockable engaging connections provided on at least one side of the seat adjusting device as the fastening mechanism between the seat adjusting device and the vehicle floor and/or between a seat shell of the seat assembly and the seat adjusting device. On the opposite side of the seat adjusting device there are provided fastening connections preferably formed as screw connections which may be tightened to lock said engaging connections for a firm fastening of the assembly. The seat adjusting device is adapted to be manually operated by an auxiliary actuating device in the event of malfunction of elements thereof such as drive motors, gear units or interconnecting flexible shafts.

45 Claims, 22 Drawing Figures

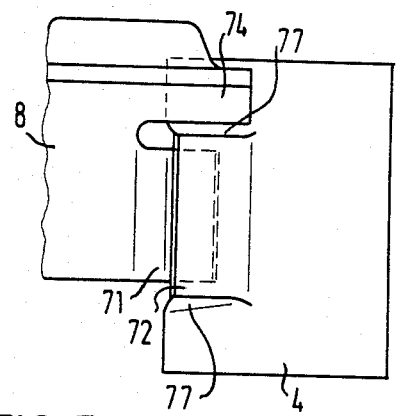
FIG.5
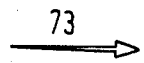
FIG.6
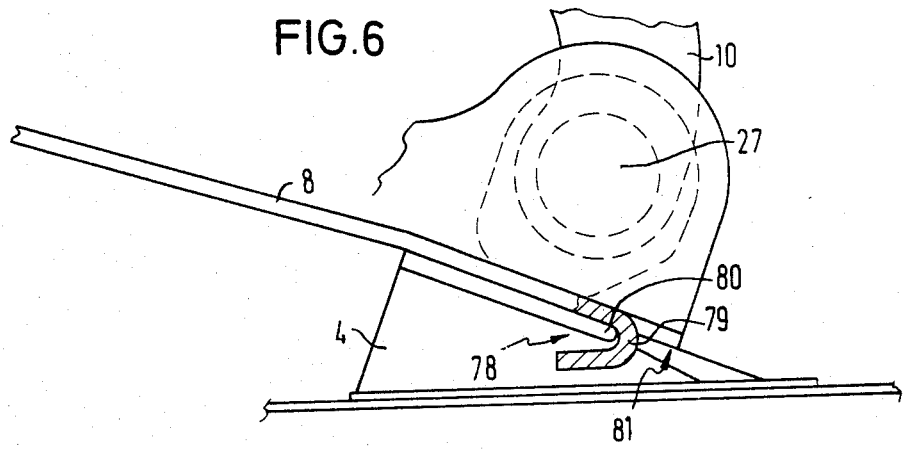

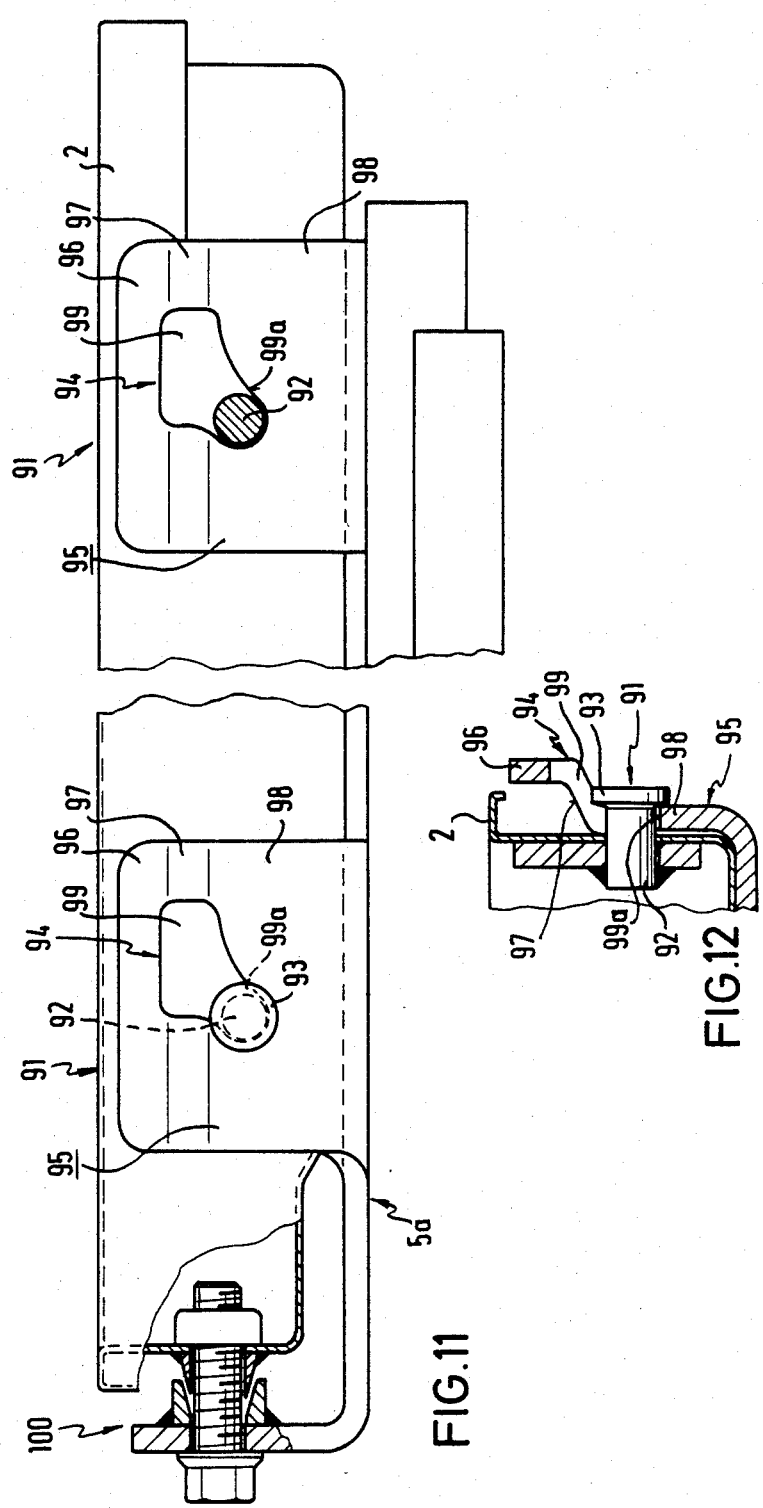

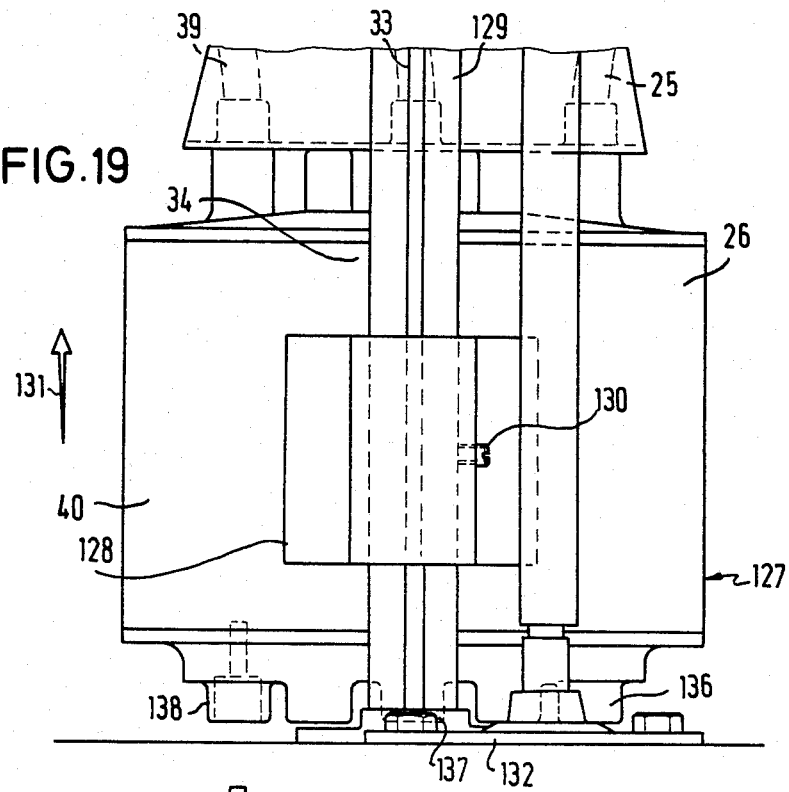
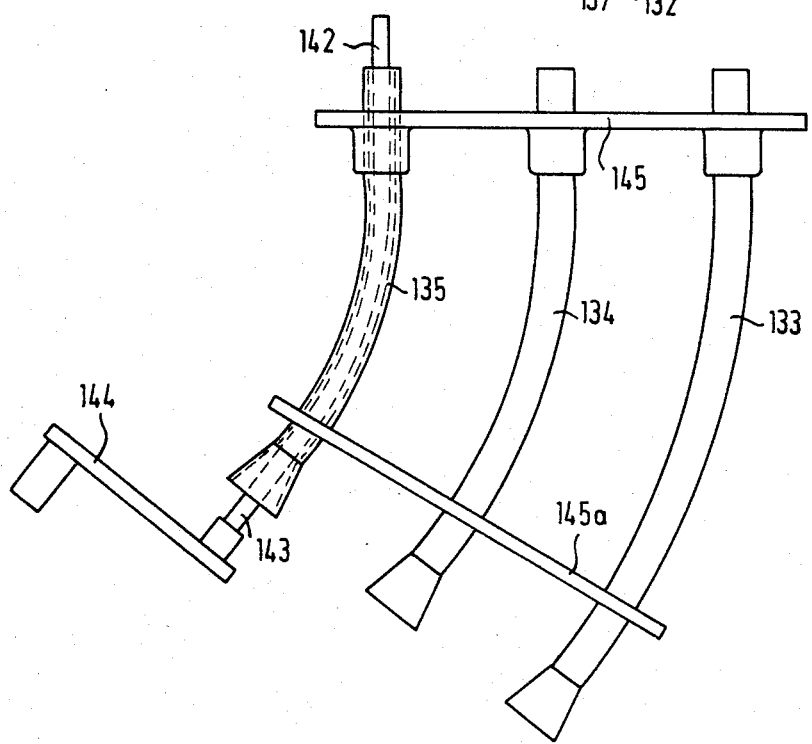
FIG.19

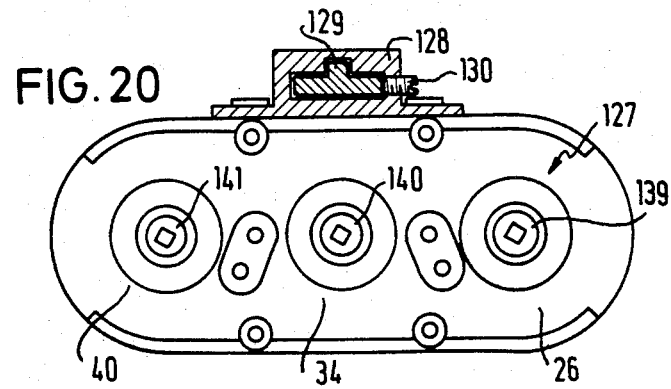
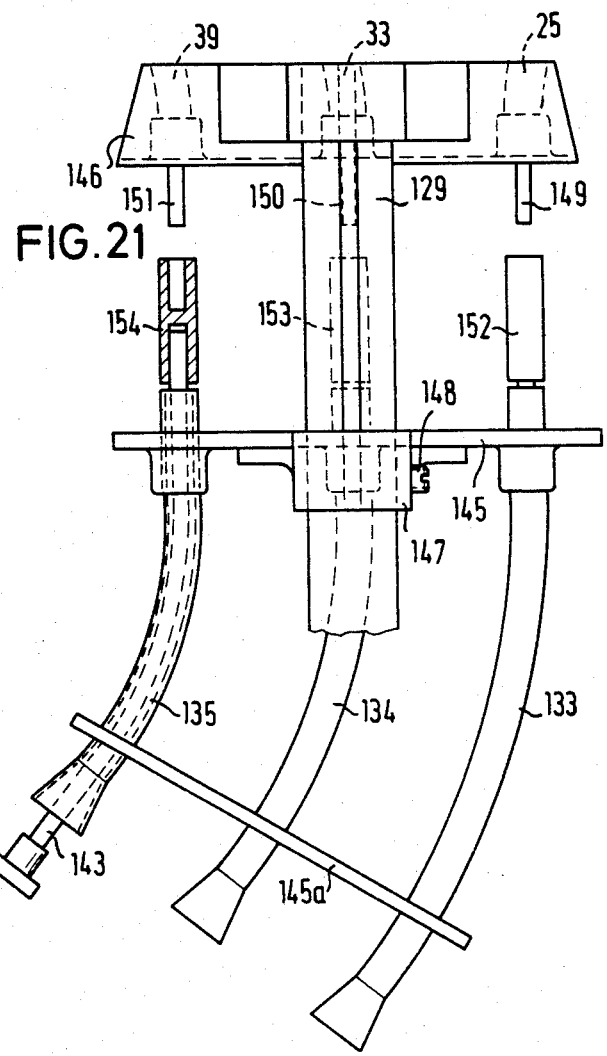

FASTENING ARRANGEMENT FOR A MOTOR VEHICLE SEAT INCLUDING A SEAT ADJUSTING DEVICE

This is a continuation of application Ser. No. 140,614 filed Apr. 15, 1980.

The present invention relates generally to motor vehicle seating assemblies and more particularly to an arrangement for quickly fastening on a vehicle floor an electrical seat adjusting device and for also fastening on said seat adjusting device the seat member of said seat assembly.

When the seat assembly of a motor vehicle is equipped with a mechanical or electrical seat adjusting device in accordance with the state of the art, such a seat adjusting device is usually provided as an integral component part of the seat assembly, as described, for example, in Swiss Pat. No. 290,165 and U.S. Pat. No. 2,277,927. Alternatively, mounting of at least the seat adjusting device would require a plurality of screw connections on the seat, as for example in the adjustable seat assembly described in U.S. Pat. No. 2,240,143.

In the first case, it is necessary, when mounting the seat adjusting device in a motor vehicle, to mount the seat together with the seat adjusting device as a unit. Due to the narrow space in the motor vehicle, this not only results in difficulties in the assembly procedure, but it also makes difficult elimination of malfunctions in the adjusting device of a mounted, adjustable vehicle seat.

When the seat adjusting device is a separate unit which must be fastened to the seat with a plurality of screw connections, it is also again virtually unavoidable, due to the narrow space in the motor vehicle, that the seat be screwed to the seat adjusting device before mounting so that both may be mounted as a unit in the motor vehicle. In the case of malfunctions in the seat adjusting device, this results in the same difficulties as arise in the case where the vehicle seat and the seat adjusting device are formed as an integral unit. In addition, the large number of screw connections require relatively long assembly times. This time requirement could become especially burdensome because of the narrow space conditions in a motor vehicle and because of the difficulties which may arise in the assembly procedure when the seat is screwed to the seat adjusting device after the latter has been mounted.

Another difficulty caused by narrow space conditions in a motor vehicle results from the fact that the seat adjusting device is first fastened to the vehicle floor usually by means of four screw connections, including two screw connections at the forward side of the seat adjusting device and two screw connections at the rearward side thereof. These difficulties result in correspondingly long time requirements for performing the assembly operation, and elimination of malfunctions in the seat adjusting device also involves the same difficulties.

The present invention is especially directed to the task of providing an arrangement enabling quick fastening of a seat adjusting device on the floor of a motor vehicle and/or of a seat member on the seat adjusting device, by means of which the aforementioned difficulties in assembly are eliminated and the time requirements for the assembly procedure may be reduced. Better and quicker access to the seat adjusting device for eliminating malfunctions may be achieved, and it is particularly notable that the seat adjusting device may be mounted in the motor vehicle initially by itself without interference from the seat member. Nevertheless, the seat member can be mounted in a simple and efficient manner on the seat adjusting device after the seat adjusting device has been mounted on the vehicle floor.

SUMMARY OF THE INVENTION

Briefly, the present invention may be described as a mounting arrangement for a vehicle seat assembly having a seat member, including a seat adjustment device particularly of the electrically operated type, for enabling expedient fastening of said seat assembly to a vehicle floor comprising lockable engaging connection means provided in at least one side of said seat adjusting device and arranged to operate as the fastening connection between said seat adjusting device and at least one of said vehicle floor and said seat member.

The arrangement according to the invention makes it possible to quickly engage the seat adjusting device on vehicle floor without difficulties with few manipulations in a simple and expedient manner at least at one side thereof; for example, at its forward or rearward side taken in the travel direction. Similar advantages may be achieved with regard to the fastening of the seat member on the seat adjusting device.

In an extreme case, only two screw connections must be tightened, so that the difficulties and the time requirement for the assembly are significantly reduced, particularly when the engaging connections are provided on that side of the seat adjusting device where the assembly is especially impaired because of narrow space. Although this depends upon the type of vehicle involved, in the conventional passenger cars it is usually the rearward side of the seat adjusting device where the greatest difficulties arise with respect to assembly of the seat mechanisms.

A preferred embodiment of the mounting system according to the invention is distinguished by the fact that, at least on the side of the seat adjusting device which is located opposite the side provided with the engaging connections, there are provided between the seat adjusting device and the vehicle floor and/or between the seat and the seat adjusting device one or more fastening connections which lock the engaging connection or connections. These are preferably screw connections.

In this embodiment, conventionally used screw connections are not used merely for fastening, but they advantageously fulfill a double function. First, they fulfill the usual function of a fastening device. However, they also fulfill further the function of providing a locking effect, and, depending on the type of locking effect, they may also fulfill the further function of tightening the engaging connections. In spite of the twofold function of these fastening connections which are preferably constructed as screw connections, the requirements for assembly of the latter are practically the same as in the conventional screw connections.

Various embodiments of engaging connections can be used in accordance with the invention.

A first embodiment is distinguished by the fact that the engaging connection is constructed as a bolt-/keyhole connection which is provided with a bolt arranged on one of the two parts to be fastened together, with a keyhole being arranged on the other of the two parts to be fastened together. The keyhole may be formed with a preferably circular hole whose diameter is somewhat larger than the bolt head and which continues into a wedge-shaped hole whose largest width is larger and whose smallest width is smaller than the diameter of the bolt shaft.

Such a connection is particularly simple with respect to its construction because the keyholes can be reproduced in one working step together with other holes, so that only relatively insignificant additional expenditures are required for the production of the bolt/keyhole connection.

This bolt/keyhole connection can be particularly constructed in such a way that the depth of the wedge-shaped hole increases continuously in the direction of the wedge, wherein its greatest depth is somewhat greater and its smallest depth is somewhat smaller than the clear width between the bolt head and the bolt base.

In this manner, a rattle-free fastening results by a wedging effect created in two planes which are perpendicular relative to each other.

It is possible to further increase the stability and to reduce rattling of the mounting system by providing a plurality of bolt/keyhole connections wherein the axes of the bolts extend preferably perpendicularly, rather than parallel, to each other.

Since in a bolt/keyhole connection, a more stable fastening connection is obtained in the longitudinal direction of the keyhole, the latter case results in an especially stable connection in two planes which are not parallel to each other.

In accordance with a second embodiment, the engaging connection is constructed as a lug/plate connection which has at one of the two parts to be fastened together a lug which can slide under a plate provided at the other of the two parts to be fastened together.

This type of engaging connection is also particularly simple with respect to its construction and, moreover, it causes the least difficulties with regard to the engagement of one part of the engaging connection into the other part, to wit, engagement of the lug into the plate.

More particularly, the plate may have side members which limit the lateral play of the lug, so that any possible play during assembly is reduced and a firm joinder of parts is achieved.

Furthermore, the side members of the plate and/or of the lug may be constructed so as to narrow in a wedge shape in the sliding direction thereof so that the lateral edges of the lug will be wedged between the lateral edges of the plate. This significantly reduces rattling in the assembly.

The danger of creating points where rattling may occur is further reduced by forming the plate together with the part at which it is arranged to define a wedge-shaped recess in the longitudinal section and/or when the lug is constructed so as to narrow in a wedge shape so that the upper side of the lug is wedged with the plate.

Another approach for preventing creation of points where rattling may occur and for simultaneously increasing the stability of the connection involves forming the engaging connections as a plurality of lug/plate connections with lugs which are not parallel, but preferably perpendicular to each other.

A third embodiment of the engaging connection is distinguished by the fact that the engaging connection is constructed as a hook/engagement means connection, which is provided with a hook on one of the two parts to be connected and with hook engagement means on the other of the two parts to be connected. Such an engaging connection is simple in construction and can be produced inexpensively, particularly when the hook is formed by the bent end of one part and the hook engagement means is formed by the edge of an opening provided in the other part.

Also in this case, for obtaining an especially stable fastening which is simultaneously free of rattling, a plurality of hook/engagement means connection can be provided with a linear contact between the hook and the hook engagement means, wherein the lines of contact extend perpendicularly rather than parallel to each other.

A fourth embodiment of an engaging connection which can be used in accordance with the invention is characterized in that the engaging connection is constructed as a wedge shoe/wedge rail connection, which has a wedge shoe which is provided on one of the two parts to be fastened to each other, with a wedge rail sliding into the wedge shoe to become wedged therein being arranged on the other of the two parts to be fastened together.

Such an engaging connection insures an especially stable fastening at the point of engagement, and can preferably be used in all four corners of the seat shell, and a single screw connection may be sufficient for tightening and locking all of the four wedge shoe/-wedge rail connections.

A preferred structural embodiment of the wedge shoe/wedge rail connection is constructed in such a way that the wedge shoe has a T-shaped cross-section and the wedge rail has a C-shaped cross-section, and that the side edges of the two lateral flanges of the T-shaped section of the wedge shoe and/or the inner side edges of the wedge rail which engage the aforementioned side edges of the wedge shoe extend in a wedge shape relative to each other in the longitudinal direction of the section. Preferably, a plurality of wedge shoe/wedge rail connections are provided in which the planes in which the two flanges of the T-shaped section are located extend preferably perpendicularly rather than parallel to each other. This again results in a fastening of the seat adjusting device and of the seat which is free of rattling.

Finally, a fifth embodiment of the engaging connection is distinguished by the fact that the engaging connection is a bolt/blind slot connection, which is provided with a slot closed at least at one of its ends in its longitudinal direction and provided on one of the two parts to be connected to each other. A bolt which can be locked in a secure manner is provided so as to have contact at an end of the slot. The bolt/blind slot connection is particularly suited for use at more than two points as the connection between two parts which are to be fastened to each other, without requiring threading of a plurality of bolts in respective blind slots which could pose particular difficulties, especially since the bolt/blind slot connections can easily be arranged in such a manner that their bolts can be threaded in pairs into the corresponding blind slots. That is, after threading in the first pair of bolts, the remaining bolts are practically automatically threaded into their blind slots by tilting that part at which the bolts are provided.

Although the bolt/blind slot connections can be constructed in an especially simple manner when a screw connection is provided for locking the bolt, an especially accident-proof fastening may be obtained by providing a lockable stirrup for locking each of the bolts. A fastening connection of especially high strength is obtained in cases where the slot into which the bolt is inserted, and/or an additional slot which is provided in the aforementioned lockable stirrup and into which the bolt is also threaded, is closed in the plane which extends perpendicularly to the bolt axis.

The invention also provides the facility for auxiliary actuation of the seat adjusting device. The electrical seat adjusting device is constructed so that it can be connected to an auxiliary actuating device which facilitates adjustment in the case of failure of one or more electric motors, gear units or flexible shafts which connect the gear units to the electric motors.

In summary, the present invention provides a mechanism for fastening of the seat adjusting device to the vehicle floor or of the seat to the seat adjusting device while also providing the facility for auxiliary actuation of the seat adjusting device in the case of failure of its motors and/or gear units. Both of these functions are particularly important in the cases where either the motors or the gear units or the kinetic parts of the seat adjustment mechanism fail and the seat adjustment devices or the seat shell must either be moved into a different position or be replaced. Furthermore, the expedient fastening system provided by the invention makes the assembly sequence performed in the automobile factory simpler, with significant reduction in the weight of parts which must be handled by an assembly worker due to the fact that the seat adjusting device can be mounted in the vehicle without the seat shell or member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

In the drawings:

FIG. 1a is a bottom view of a detail of the assembly of FIG. 1;

FIG. 5 is a top view of the lug/plate connection according to FIG. 3;

FIG. 6 is a longitudinal view partially in section taken through a hook/engaging means connection which is also provided at the rearward end of a seat adjusting device for fastening the latter to a vehicle floor;

FIG. 11 is a partially sectional side view of a first embodiment of a bolt/blind slot connection between a seat shell and a seat adjusting device;

FIG. 12 is a sectional view taken through a bolt/blind slot connection according to FIG. 11;

FIG. 19 is a top view of the motor part of the seat adjusting device according to FIG. 2 with an auxiliary motor actuating device;

FIG. 20 is a front view of the motor part illustrated in FIG. 19 for driving the seat adjusting device according to FIG. 2 with a section taken through a suspension for the motors; and FIG. 21 is a partially sectional top view of an auxiliary actuating device for connection to flexible shafts which lead to the gear units of the seat adjusting device illustrated in FIG. 2.

DETAILED DESCRIPTION OF THE PREFERRED EMBODIMENTS

Figure 1:
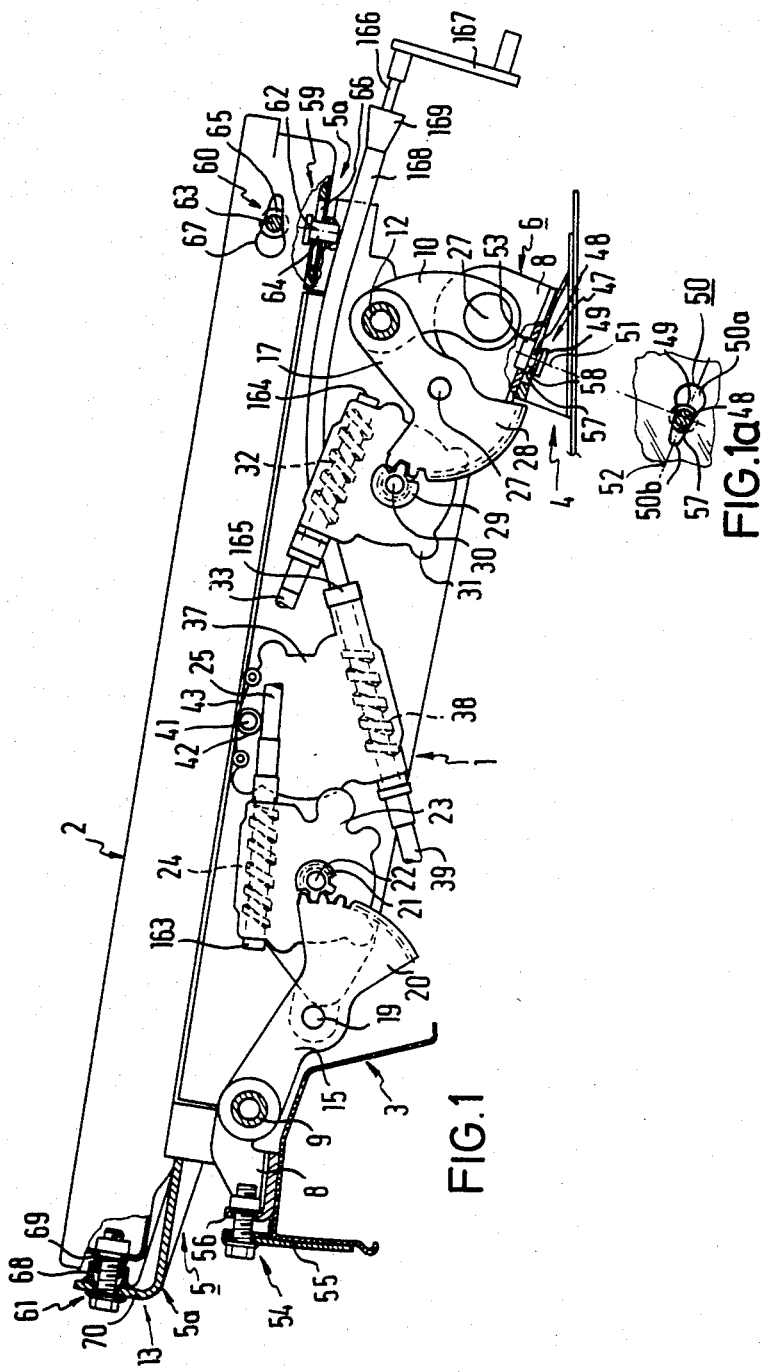
FIG. 1 is a longitudinal sectional view taken through a seat adjusting device showing its fastening to the floor of a motor vehicle, and the fastening of the seat shell to the seat adjusting device.
Figure 2:
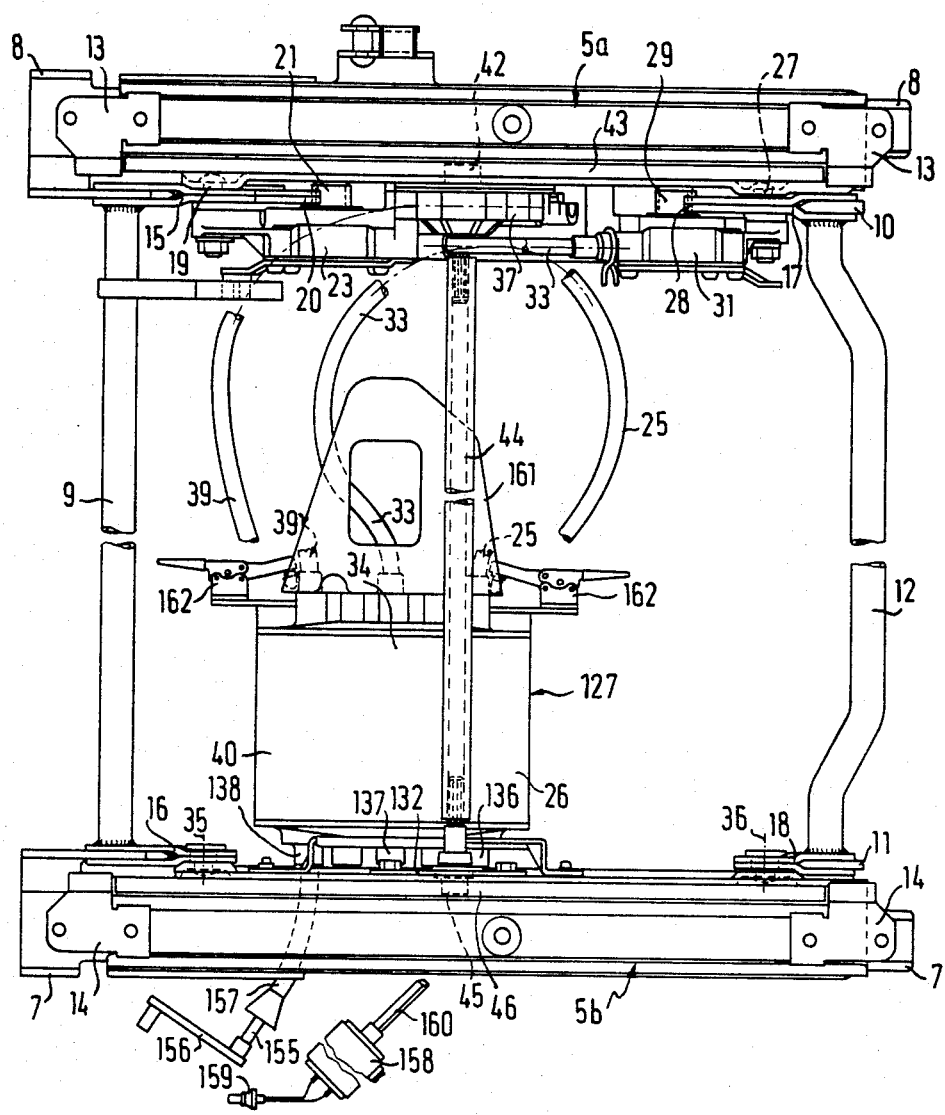
FIG. 2 is a top view of the seat adjusting device illustrated in FIG. 1.

FIGS. 1 and 2

Referring to the drawings wherein similar reference materials are used to refer to like parts, and referring initially to FIG. 1 which illustrates a side view of a fastening assembly of a motor vehicle seat to the vehicle floor through a seat adjusting device which is generally denoted by reference numeral 1, the motor vehicle seat (not illustrated as such) includes a seat shell 2 through which the motor vehicle seat is fastened at its forward and rearward ends taken in travel direction to the seat adjusting device 1. The floor of the motor vehicle to which the seat adjusting device 1 is fastened at its forward and rearward ends is also not shown in its totality, and only a forward cross member 3 and a rearward cross member 4 of the vehicle floor are illustrated.

The seat adjusting device 1 comprises a generally rectangular, upper frame 5 and an essentially rectangular lower frame 6. The frames 5, 6 lie essentially in a plane which extends from parallel to the vehicle floor to a slightly inclined orientation taken in the direction of travel, wherein the frames 5, 6, in turn, generally define an included acute angle the magnitude of which depends on the respective adjustment position of the seat adjusting device 1, and whereby the frames 5, 6 can also extend parallel to each other in one of these adjustment positions.

FIG. 2 which shows a top view of the seat adjusting device 1 not only depicts the essentially rectangular shape of the upper and lower frames 5, 6 but depicts also, in connection with FIG. 1, the fundamental design of these two frames in order to afford a better understanding of the fastening of the lower frame 6 to the forward cross member 3 and the rearward cross member 4 of the vehicle floor and the fastening of the seat shell 2 at the upper frame 5.

The lower frame 6 has two longitudinal struts 7, 8 which extend parallel of each other and whose forward ends (located on the left in FIGS. 1 and 2) are directly connected to each other by means of a transverse strut 9 and whose rearward ends are connected by means of a transverse strut 12, each through an articulated lever 10, 11. The upper frame 5 has two parallel longitudinal struts 13, 14 whose forward ends are connected to each other by means of the transverse strut 9 each through an articulated lever 15, 16 and whose rearward ends are connected to each other by means of the transverse strut 12 each through an articulated lever 17, 18.

Together with the articulated levers 10, 11 and 17, 18 and 15,16, the transverse struts 9 and 12 form articulated connections between the upper and the lower frames 5,6 at the forward and rearward ends of these frames by means of which the distance between the two frames at their forward and rearward ends and, thus, the level and the inclination of the vehicle seat can be adjusted. The transverse strut 9 forms the axis of an articulated connection between the forward ends of the lower frame 6 and the one end of the articulated levers 15 and 16. The articulated lever 15 is rotatably supported on an axle 19 which is arranged on the upper frame 5 and extends approximately through the longitudinal center of the articulated lever 15. At its other end, the articulated lever 15 is formed as a toothed segment 20 which meshes with a gear 21. The gear 21 is mounted on the power take-off shaft 22 of a gear unit 23 which is connected to an electric motor 26 through a worm 24 and a flexible shaft 25.

The transverse strut 12 forms the axis of an articulated connection between one end of the articulated lever 10,17 and the articulated lever 11,18. The respective other end of the articulated lever 10,11 is connected in an articulated manner to the rearward end of the lower frame 6, the axis of one of these two articulated connections being illustrated in FIG. 2 at 27. The articulated lever 17 which is rotatably supported, in the region of its longitudinal center, on an axle 27A arranged on the upper frame 5 is, at its other end, provided with a toothed segment 28 which meshes with a gear 29 which, in turn, is arranged on the power take-off shaft 30 of a gear unit 31. The gear unit 31 is coupled to an electric motor 34 through a worm 32 and a flexible shaft 33.

The articulated levers 16 and 18 which correspond to the articulated levers 15 and 17 are, however, not separately driven but only form a parallel connection with the first-mentioned articulated levers and, at their respective other ends, they are connected in an articulated manner to the upper frame 5 through axles 35 and 36.

Finally, a third gear unit 37 connected to a third electric motor 40 through a worm 38 and a flexible shaft 39 is provided for adjusting the vehicle seat in the direction of travel. On the power take-off shaft 41 of the gear unit 37 there is arranged a gear 42 which meshes with a rack 43 which is rigidly mounted to an upper part 5a of the upper frame 5 which is slidably supported in the direction of travel. The power take-off shaft 41 is extended through a shaft 44 to the oppositely located side of the upper frame and at this location it also drives through a gear 45 corresponding to the gear 42, a rack 46 which is rigidly mounted in another upper part 5b of the upper frame 5. The part 5b is, in turn, in the same manner as the upper part 5a, slidably supported in the remaining portion of the frame 5 in the direction of travel.

At this point, it is noted that the longitudinal struts 7,8 of the lower frame 6 and the longitudinal struts 13,14 of the upper frame 5 can each be mutually connected by means of one or more additional transverse struts in order to make the two frames stiffer. It is particularly advantageous to connect by means of a transverse strut the two upper parts 5a and 5b of the upper frame 5 at the forward and/or rearward ends.

In considering the fastening of the seat adjusting device 1 at the forward and rearward cross members 3,4 of the vehicle floor and the fastening of the seat shell 2 on the upper parts 5a and 5b of the upper frame 5 it should be noted that the same type of device can be used for fastening the seat adjusting device on the vehicle floor and for fastening the seat shell 2 to the seat adjusting device 1. Different types of fastening devices for the seat adjusting device 1 at the vehicle floor, on the one hand, and for fastening of the seat shell 2 at the seat adjusting device 1, respectively, are described only in order to avoid unnecessary repetition. Also, in those cases in which the fastening of the forward end of the seat adjusting device 1 at the vehicle floor and of the forward end of the seat shell 2 at the seat adjusting device 1 is constructed differently than the fastening of the rearward ends of these parts, the manner of fastening at the front and the manner of fastening at the rear can be interchanged.

All arrangements for fastening the seat adjusting device 1 on the vehicle floor and the seat shell 2 on the seat adjusting device 1 described in detail hereinafter have in common that the fastening connection between these parts comprises one or more, and generally two, lockable engaging connections on at least one side, namely the forward or the rearward side.

The embodiment of the fastening connection between the seat adjusting device 1 and the forward and rearward cross members 3,4 of the vehicle floor illustrated in FIG. 1 shall now be discussed.

A bolt/keyhole connection which in its totality is denoted by reference numeral 47 is provided as the lockable engaging connection at the right and left rearward end of the seat adjusting device 1, i.e. between its lower frame 6 and the rearward cross member 4. This bolt/keyhole connection 47 has a bolt shaft 48 which is preferably round in cross section and is welded to the seat adjusting device 1. The bolt shaft 48 ends in a bolt head 49 which has an increased diameter relative to the bolt shaft. The bolt shaft 48 engages in an elongated keyhole slot 50 which is provided in the rearward cross member 4 of the vehicle floor (see FIG. 1a). The cross section of the keyhole slot 50 in a plane which is perpendicular to the axis 51 of the bolt shaft 48 is essentially composed of a circular hole 50a and an adjacent, wedge-shaped hole 50b, wherein the diameter of the circular hole 50a is somewhat larger than the diameter of the bolt head 49, while the wedge-shaped hole 50b narrows from a width which is somewhat larger than the diameter of the bolt shaft 48 to a width which is smaller than the diameter of this bolt shaft (see FIG. 1a). The circular hole 50a is advantageously contiguous with the wedge-shaped hole 50b in a rounded transition.

Furthermore, the keyhole 50 is constructed in such a way that its height, i.e. its dimension in a sectional plane which extends along the axis 51 and also along the longitudinal axis 52 of the keyhole 50, increases in the direction toward the narrow end of the wedge-shaped hole 50b, in such a manner that the height of the keyhole 50 in the region of the circular hole 50a and in the immediately adjacent region of the wedge-shaped hole 50b is somewhat smaller than the axial length of the bolt shaft 48 which, on the side opposite the bolt head 49, is defined by a widening bolt base 53. This height of the keyhole 50 continuously increases in the region of the wedge-shaped hole 50b and, finally, becomes larger than the axial length of the bolt shaft 48. The longitudinal axis 52 of the keyhole 50 extends in the direction toward the forward end of the seat adjusting device where a screw connection 54 is provided which has the purpose of tightening and locking the bolt 48,49, 53 in the keyhole 50. This screw connection 54 acts on a lug 55 at the forward cross member 3 of the vehicle floor and at a parallel lug 56 at the forward end of the lower frame 6. The lugs 55,56 are spaced apart in the direction of the longitudinal axis 52 of the keyhole 50, so that the bolt 48, 49, 53 moves toward the narrow end of the wedge-shaped hole 50b until its bolt shaft 58 is clamped between the lateral edges of the wedge-shaped hole 50b. Simultaneously, the bolt head 49 and the bolt base 53 are clamped with the upper and lower side regions 57,58, which laterally surround the wedge-shaped hole 50b. In this manner, a tightened, locked and rattle-free fastening of the seat adjusting device 1 on the vehicle floor results.

Of course, the bolt 48,49,53 can also be provided in a reverse arrangement at the vehicle floor and the keyhole can be provided at the lower frame 6 of the seat adjusting device 1. In such case, however, the wedge-shaped hole 50b must not be directed forwardly in FIG. 1a, but must be directed rearwardly as illustrated at the top right in FIG. 1, so that the above-mentioned clamping between the bolt and the keyhole results when the screw connection 54 is tightened.

In FIG. 1, the seat shell 2 is also fastened by means of bolt/keyhole connections 59,60 which are tightened and locked by means of a screw connection 61, to the seat adjusting device 1, i.e. at the upper part 5a or 5b of the upper frame 5. In order to further secure against play, there are provided at the right and at the left rearward ends of the seat adjusting device 1 two bolt-/keyhole connections 59,60, wherein the axes 62,63 of the bolts 64,65 of these bolt/keyhole connections extend at a predetermined angle relative to each other, i.e. perpendicularly in the present embodiment. In this manner, a clamping and locking effect is achieved in two different planes which are not parallel to each other at the right as well as the left rearward end of the connection between the seat adjusting device 1 and the seat shell 2. In this case, the keyholes 66,67 are provided at the seat shell 2 and the bolts 64,65 are provided at the seat adjusting device 1, although the arrangement could also be in reverse order.

The screw connection 61 for the simultaneous clamping and locking of the bolt/keyhole connections 59 and 60 is constructed in the same manner as the screw connection 54. However, it is additionally provided with two interengaging conical bushings 68 and 69 which are concentric with the screw connection 61. One conical bushing 61, whose inner surface is conical, is fastened to a lug 70 of the upper part 5a or 5b of the upper frame 5, for example, by welding, while the other conical bushing 69, which is constructed with a conical exterior complementary to the interior of the bushing 78 and which engages the bushing 78, is fastened to the seat shell 2, for example, by welding. These two conical bushings 68,69 result in a connection which is particularly free of rattling and play between the seat adjusting device 1 and the seat shell 2. Additionally, assembly is facilitated because the screw holes through which the screw connection 61 extends can be aligned with each other more easily and quickly.

FIGS. 3-5

Figure 3:
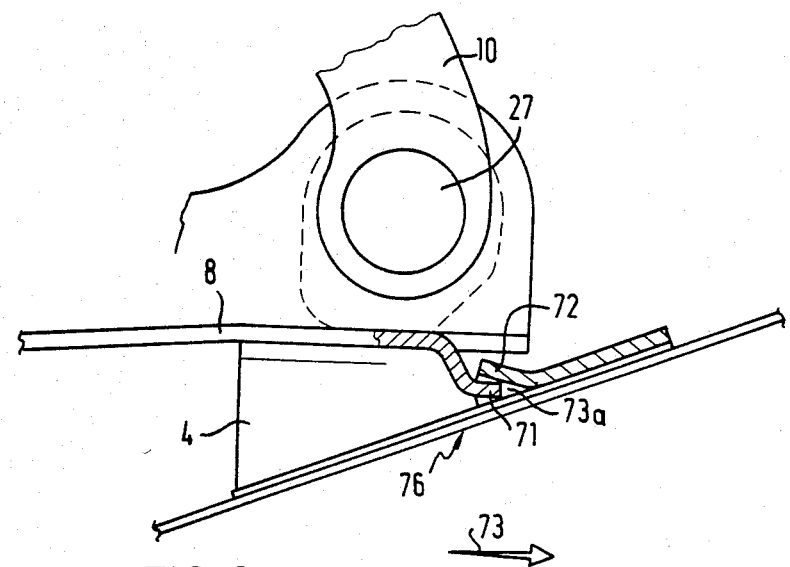
FIG. 3 is a view partially in section taken through a lug/plate connection provided between the rearward end of a seat adjusting device and the vehicle floor.
Figure 4:
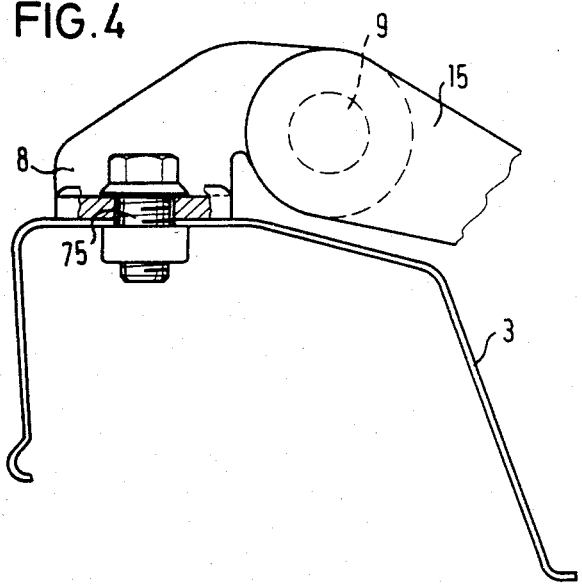
FIG. 4 is a view partially in section showing a screw connection provided at the forward end of the seat adjusting device for locking the lug/plate connection of FIG. 3.
Figure 7:
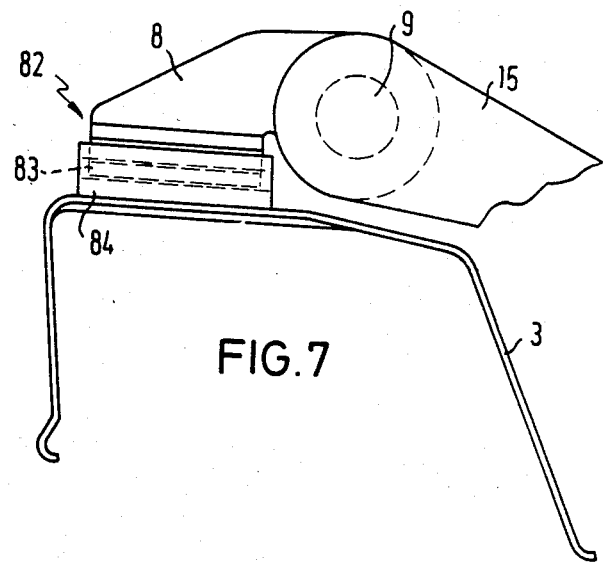
FIG. 7 is a side view of a wedge shoe/wedge rail connection between the forward end of a seat adjusting device and a vehicle floor.
Figure 10:
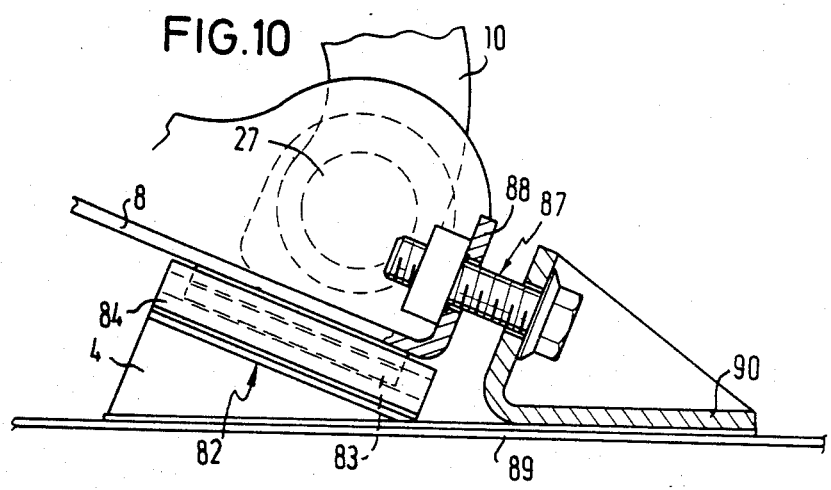
FIG. 10 is a view partially in section of a wedge shoe/wedge rail connection between the rearward end of the seat adjusting device and the vehicle floor, supplemented by a screw connection for locking the wedge shoe/wedge rail connections of FIGS. 7 and 10.

Another embodiment of a lockable engaging connection which is particularly simple in its construction is illustrated in FIGS. 3 to 5. In this case, the engaging connection between the rearward end of the longitudinal strut 8 of the lower frame 6 of the adjusting device 1 and the rearward cross member of the vehicle floor consists of an outwardly bent lug 71 which preferably consists of sheet metal, and a plate 72 which is provided at the rearward cross member 4 and under which the lug 71 is slid. Moreover, the design is such that when the lug 71 is moved rearwardly in the direction of arrow 73 it is clamped with the rearward cross member 4, for example, by being received in a wedge-shaped recess 73a between the plate 72 and a portion of the rearward cross member 4 or the vehicle floor itself (see FIG. 3). Furthermore, a part 74 of the seat adjusting device 1 arranged preferably adjacent to the lug 71 on the longitudinal strut 8 is supported on the upper side of the rearward cross member 4 (see FIG. 5).

The screw connection 75 which, according to FIG. 4, is provided for locking the lug/plate connection 76 may be a simple screw connection between the seat adjusting device 1, particularly the forward end of the longitudinal strut 8, and the forward cross member 3 of the vehicle floor which prevents the lug 71 from sliding out of the plate 72. To obtain a particularly good clamping of the lug/plate connection 76, a tightening screw connection (not shown) can be provided instead of the screw connection 75. When such a screw connection is tightened it effects a shifting of the lug 71 in the direction toward the plate 72, i.e. in the direction of arrow 73. Such a tightening screw connection can be constructed similarly to the screw connection 61 of FIG. 1. However, contrary to the screw connection 61, it has the effect that the parts to be connected are moved away from each other rather than toward each other.

It remains to be mentioned that, as illustrated in FIG. 5, the plate 72 has side members 77 so that its width is adjusted approximately to the width of the lug 71 and, thus, an undesirable lateral shifting of the lug 71 is prevented. Finally, although not illustrated in the drawing, it is also possible to construct the lug 71 in the shape of a wedge, as seen in the top view of FIG. 5, so that its side edges are wedged with the side members 77.

FIG. 6

Another embodiment of an engaging connection is illustrated in FIG. 6. In this hook/engagement means connection, denoted in its totality by reference numeral 78, a hook 79 is provided at one of the parts to be connected; in the present case, the longitudinal strut 8. The hook 79 can be formed, for example, in a simple manner by downward bending of the rearward end of the longitudinal strut 8, as illustrated in FIG. 6. This hook 79 is hooked into an engagement means 80 which is provided in the other of the two parts to be connected; in the present case, the rearward cross member 4 of the vehicle, the engagement means being obtained by providing the cross member, for example, with an opening 81 whose forward edge forms the engagement means 80.

For tightening the hook 79 in the engagement means 80 and, thus, for tightening and locking the hook/engagement means connection 78, between the forward cross member 4 of the vehicle and the forward end of the longitudinal strut 8 there is provided a screw connection 54 or 61 as illustrated in FIG. 1. In the same manner as explained with reference to FIG. 5 in the lug/plate connection 76, the dimensions of the hook 79 and the engagement means 80 perpendicularly of the drawing plane of FIG. 6 are advantageously adjusted to each other and, in addition, the lateral edges of the hook 79 and/or the opening 81, i.e. the edges extending parallel of the drawing plane of FIG. 6, can be constructed in a wedge shape in such a way that these lateral edges of the hook 79 and the opening 81 are wedged together when the screw connection 54 or 61 provided at the forward end of the longitudinal strut is tightened. Thus, a fastening of the seat adjusting device 1 on the vehicle floor is obtained which is particularly true to size and free of rattling.

FIGS. 7-10

Another embodiment of an engaging connection which facilitates an especially stable fastening of the parts is the wedge shoe/wedge rail connection, denoted in its totality by reference numeral 82 and illustrated in FIGS. 7 through 10.

Figure 8:
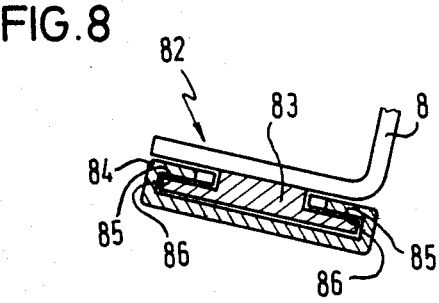
FIG. 8 is a sectional view taken through the wedge shoe/wedge rail connection of FIG. 7.
Figure 9:
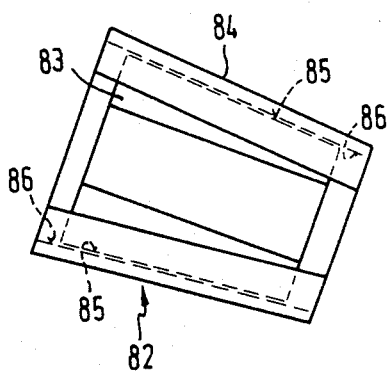
FIG. 9 is a top view of the wedge shoe/wedge rail connection according to FIGS. 7 and 8 in which the wedge shape of the lateral edges of the wedge shoe and wedge rail can be seen and wherein there is illustrated the wedge shape of the upper and/or lower surfaces of the side flanges of the wedge shoe and/or the upper and/or lower inner surfaces of the wedge rail engaging the wedge shoe.

As best seen in FIGS. 8 and 9, this wedge shoe/wedge rail connection 82 comprises a wedge shoe 83 which is fastened to one of the two parts to be connected, in this case, the longitudinal strut 8 (see FIGS. 7 and 8) and which is slidable in a C-shaped wedge rail 84 which, in turn, is arranged on the other of the two parts to be connected, in the present case, on the forward cross member 3 or the rearward cross member 4 of the vehicle floor. FIG. 9 shows the arrangement of the side edges 85 of the wedge shoe 83, which extend in the shape of a wedge in the sliding direction, and of the inner side edges 86 of the wedge rail which extend in the same manner in the shape of a wedge and are brought into wedged engagement with the side edges 85 of the wedge shoe.

For welding together of the wedge shoe/wedge rail connections 83 at the forward and rearward ends of the longitudinal strut 8, a screw connection 87 is provided between a lug 88 at the rearward end of the longitudinal strut 8 and a bearing block 90 additionally fastened to the vehicle floor 89. This screw connection 87 is constructed in the same manner as the screw connection 54 of FIG. 1. However, this screw connection can also be of a type similar to the screw connection 61 of the FIG. 1. Furthermore, the wedge shoe/wedge rail connection 82 can also be provided only at the forward or rearward end of the seat adjusting device 1, while at the respective other end a screw connection 87 or 61 only serves as the fastening device.

FIGS. 11-12

FIGS. 11 and 12 show a first embodiment of a bolt/blind slot connection, which is generally denoted by reference numeral 91, and which is provided between the seat shell 2 and the upper part 5a or 5b of the upper frame 5 of the seat adjusting device 1; namely on either side of the seat shell 2 at its forward and rearward ends in the travel direction, as illustrated in FIG. 11.

Each of the bolt/blind slot connections 91 comprises a bolt 92 which, on the one hand, is laterally welded to the seat shell 2, as particularly illustrated in FIG. 12, and which, on the other hand, has a bolt head 93 with an increased diameter relative to the bolt shaft at its end facing away from the seat shell 2. This bolt 92 is inserted into a slot 94 which is provided in a lateral lug 95 of the upper part 5a or 5b of the frame 5. To enable the seat shell 2 to be inserted from the top with the laterally projecting bolts 92, the upper part 96 is bent outwardly to such an extent that the bolt head 93 can move downwardly parallel to the inner side of the upper part 96 until it enters the slot 94 which extends from the upper part 96 through the bent portion 97 to the lower part 98 of the lug 95 and has a size such that the bolt head 93 can extend through the slot 94 to the outside of the lugs 95. The bolt head 93 is arranged in such a way that it is supported in this position at the outside of the lower part 98 of the lug 95, as illustrated in FIG. 12.

FIG. 11 shows that the slot 94 consists of an essentially rectangular portion 99 and a diagonal, downwardly extending adjacent extension 99a which ends in a rounded portion which is adjusted to the shaft of the bolt 92 and forms the final seat of the bolt 92.

A screw connection 100, which is provided at the right and left forward ends between the seat shell 2 and the upper part 5a or 5b of the upper frame 5 and which is constructed in the same manner as the screw connection 61 of FIG. 1, presses the rounded end of the extension 99a of the slot 94 against the bolt 92, so that the bolt/blind slot connection 92 is thereby tightened and locked, with particularly favorable strength conditions resulting from the fact that the slot 94 does not extend to an outer edge of the lug 95.

FIGS. 13-15

Figure 13:
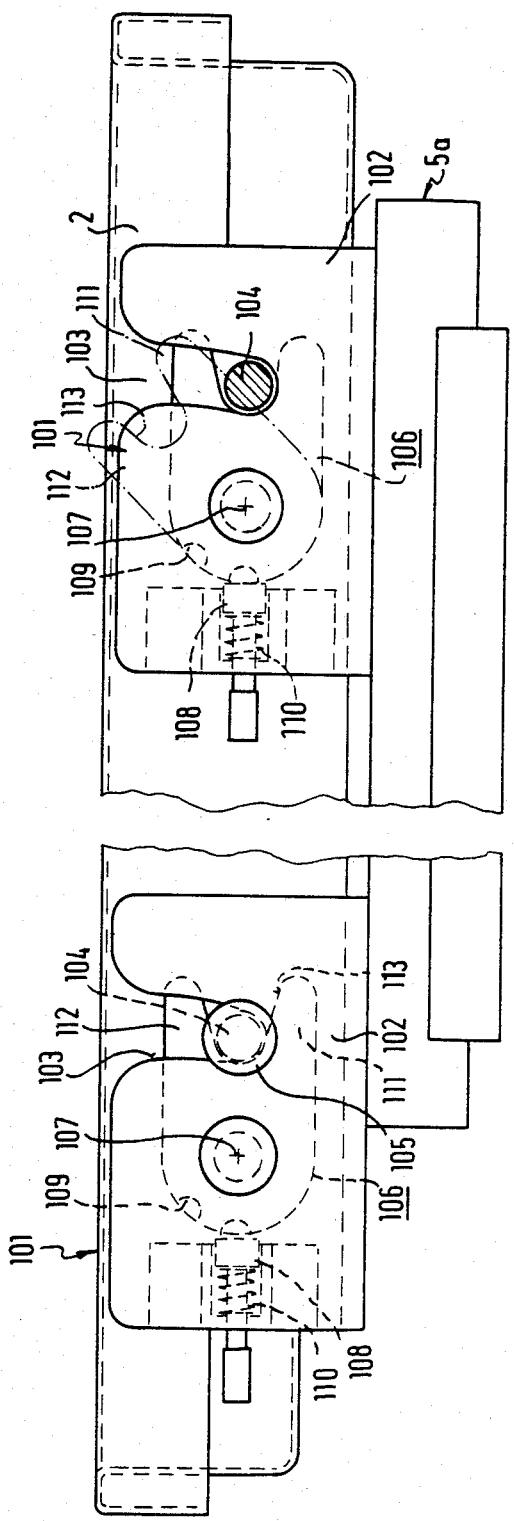
FIG. 13 is a partially sectioned side view of a second embodiment of a bolt/blind slot connection between a seat shell and a seat adjusting device.
Figure 14:
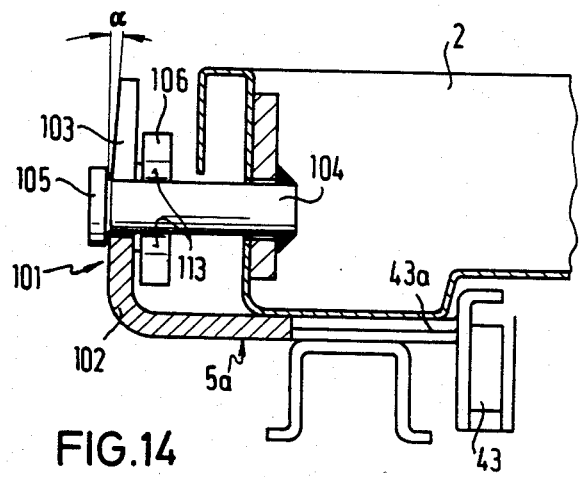
FIG. 14 is a sectional view taken through a bolt/blind slot connection according to FIG. 13.
Figure 15:
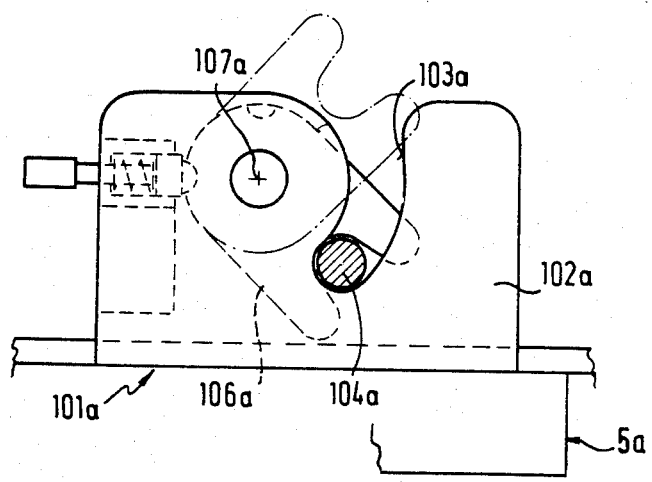
FIG. 15 is a partially sectioned side view of a modified embodiment of a bolt/blind slot connection according to FIG. 13.

FIGS. 13 and 14, and FIG. 15 show a somewhat modified embodiment of a bolt/blind slot connection which does not require a special screw connection for locking, such as the screw connection 100 of FIG. 11. This connection is the fastening connection between the seat shell 2 and the seat adjusting device 1.

This bolt/blind slot connection generally denoted by reference numeral 101 comprises an upwardly extending lug 102 arranged at each of the forward and rearward ends of the upper parts 5a and 5b of the upper frame 5. The lugs 102 correspond in principle to the lugs 95 of the embodiment according to FIGS. 11 and 12 since they also receive between them the seat shell 2 and are provided with a slot 103 which extends downwardly from the upper edge of the lug 102 in the shape of a slight arc, narrowing downwardly and ending in a rounded portion at its lower end. This rounded portion is adjusted to the diameter of the shaft of a bolt 104 which is laterally welded to the seat shell 2 and which has a widened bolt head 105 which is supported on the outside of the lug 102.

For locking the bolt 104 in the blind end of the slot 103, a stirrup 106 is provided which is arranged on the lug 102 so as to be pivotable about an axis 107 which is parallel to the axial direction of the bolt 104.

This stirrup 106 can be locked in two positions by means of a locking bolt 108 which can engage one of two locking recesses 109 of the stirrup 106 and is held in this position by means of a spring 110. In the first of these two locking positions, illustrated in dash-dotted lines on the right hand side of FIG. 13, the lower arm 111 of this stirrup extends transversely over the longitudinal middle portion of the slot 103, so that the bolt 104 can be inserted into the upper end of the slot 103 and can be placed on the arm 111. Subsequently, the locking bolt 108 is pulled back, so that the stirrup 106 can pivot in the position illustrated in solid and broken lines in FIG. 13 in which its upper arm 112 is placed transversely over the longitudinal middle portion of the slot 103 and locks the bolt 104 which has now reached the blind end of the slot 103 because the locking bolt 108 engages the locking recess 109 corresponding to this position. As can be seen in FIG. 13, the slot 13 of the stirrup 106 which is defined by the arms 111 and 112 is constructed in such a way that it just receives with its blind end the bolt 104 in the position of the stirrup 106 illustrated on the left hand side of FIG. 13. Accordingly, the stirrup 106 operates in the manner of a door lock in motor vehicles.

Finally, it shall be mentioned that FIG. 14 additionally shows the rack 43 which is mounted on the upper part 5a of the frame 5 through a rack support 43a.

The bold/blind slot connection 101a illustrated in FIG. 15 is modified over the embodiment according to FIGS. 13 and 14 in that, in this case, the blind end of the slot 103a in the lug 102a is located deeper than the axis 107a of the stirrup 106a, so that the seat adjustment is especially secure in the case of accidents due to the bolt 104a which is shown in its locked position in FIG. 15.

As indicated in FIG. 14, in the embodiments according to FIGS. 13 to 15, the outer surface of the lug 102 or 102a can be constructed in such a way that, at least in the region of the lateral edges of the slot 103 or 103a, it extends further outwardly the more it approaches the blind end of this slot, i.e., it widens conically toward the bottom so that the bolt head 105 is wedged together with the outer surface of the lug 102 or 102a. This is important for a rattle-free fastening of the seat. This slight bevelling is indicated by the angle α in FIG. 14.

FIGS. 16–18

Figure 16:
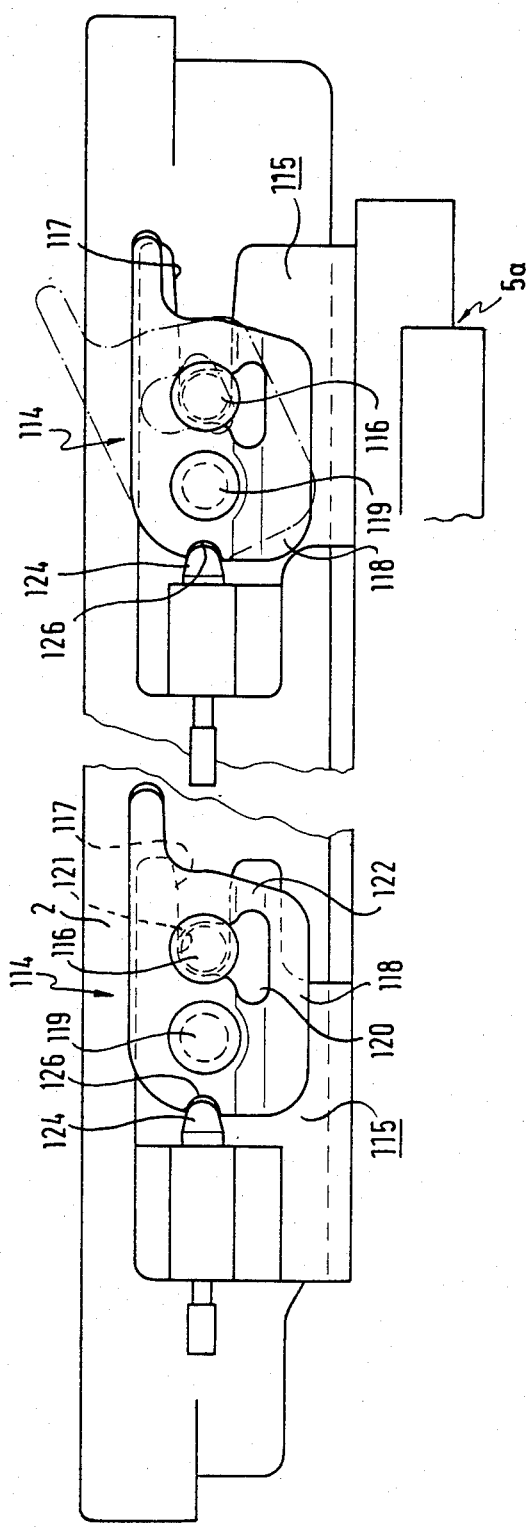
FIG. 16 is a side view of a third embodiment of a bolt/blind slot connection between a seat shell and a seat adjusting device.
Figure 18:
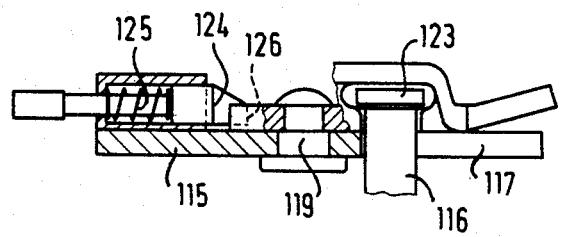
FIG. 18 is a longitudinal section taken through a bolt/blind slot connection according to FIGS. 16 and 17.
Figure 17:
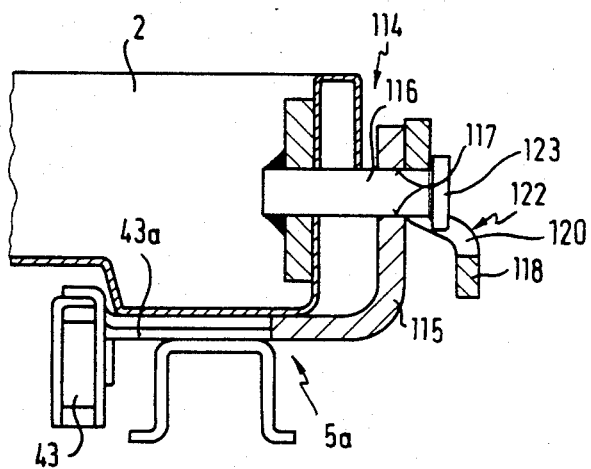
FIG. 17 is a sectional view taken through a bolt/blind slot connection according to FIG. 16.

Finally, FIGS. 16 to 18 show an embodiment of a bolt/blind slot connection which is denoted in its totality by reference numeral 114 and which, in principle, is a combination of the embodiment according to FIGS. 11 and 12, and the embodiment according to FIGS. 13 and 14, since it combines advantages of these two embodiments, such as high strength and especially secure locking action.

Also in this embodiment, lateral, upright lugs 115 are provided on the upper part 5a or 5b of the frame 5 of the seat adjusting device 1, while laterally projecting bolts 116 are welded to the seat shell 2. Each of the bolts 116 is inserted through a horizontally extending slot 117 on the respective lug 115. This slot 117 extends from the right edge (as seen in FIG. 16) of the lug 115 and narrows in a wedge shape to a rounded portion located at its blind end which is adjusted to the bolt 116. A stirrup 118, arranged for locking the bolt 116 in its fastening position, is rotatable about an axle 119 which extends parallel to the axial direction of the bolt 116.

The stirrup 118 has a longitudinal slot 120 which, at its upper longitudinal side, continues into a transverse slot 121 which, in turn, ends in a rounded portion which is adjusted to the bolt 116. In the region of the longitudinal slot 120, the stirrup 118 has an outwardly bent portion 122, as can be particularly seen in FIG. 17. This bent portion extends to the outside to such an extent that the bolt head 123 of the bolt 116 can be shifted from the position indicated in FIG. 16 on the right in dash-dotted lines, of the stirrup 118 between the outer side of the lug 115 and the inner side of the stirrup 118 through the longitudinal slot 120 into the position illustrated in FIG. 17 in which the bolt head 123 is now located on the outside of the stirrup 118.

The stirrup 118 can then be pivoted into the position illustrated on the left in FIG. 16 and can be locked by means of a locking bolt 124 which is pressed by means of a spring 125 into a corresponding locking recess 126 of the stirrup 118. Since the two slots 117 and 121 in which the bolt 116 is received in locking engagement extend perpendicularly to each other, the bolt 116 is firmly locked. Furthermore, since the stirrup 118 is closed, the connection between the seat adjusting device 1 and the seat shell 2 is quite strong.

FIGS 19–21

With reference to FIGS. 1 and 2, as well as FIGS. 19 to 21, embodiments of an auxiliary actuation of the seat adjusting device 1 shall be described which are provided for the case wherein there occurs failure of one or more of the electric motors 26, 34 and 40 and/or of one or more of the gear units 23, 31 and 37.

As FIGS. 2, 19 and 20 show, the electric motors 26, 34 and 40 are connected in parallel arrangement to form a structural unit identified as a motor block 127. In the embodiment featuring auxiliary actuation according to FIGS. 19 to 21, this motor block 127 is fastened to a hollow section member 128 which has a T-shaped hollow profile which corresponds to the T-shaped solid profile of a sectional rail 129 which extends through the hollow sectional member 128 and along which the hollow section member 128 can be moved. The motor block 127 is held in the position required for operation by means of a locking device which, in the present case, comprises a locking screw 130 provided in a threaded hole in the hollow section member 128. The T-shaped sectional rail 129 is fastened to the same component to which the motor block 127 would be fastened if there were no auxiliary actuation.

When one or more of the three electric motors 26, 34 and 40 fail, the motor block 127 can be moved in the direction of arrow 131 by unscrewing the locking screw 130. As a result, it is removed from the component 132, which may be, for example, the longitudinal strut 14 of the upper frame of the seat adjusting device 1 which laterally covers the motor block 127, since otherwise auxiliary actuation would become impossible.

Flexible guide tubes 133, 134 and 135 for auxiliary actuation shafts can now be inserted in connecting pieces 136, 137 and 138 which are provided at the connecting points of the flexible shafts 25, 33 and 38 at opposite sides of the motor block 127 as covers for the shafts 139, 140 and 141 of the electric motors 27, 34 and 40, which shafts are accessible also at this end. The ends of these shafts 139, 140 and 141 have a recessed square, as illustrated in FIG. 20, and in this recessed square there is inserted an external square 142 provided at the end of an auxiliary actuating shaft 143, wherein the accessible end of the auxiliary actuating shaft 143 is provided with a manual drive device, in the present case, a crank 144. For facilitating insertion of the forward ends of the guide tubes 133, 134 and 135 for the auxiliary actuating shafts into the openings of the connecting pieces 136, 137 and 138, a connecting web 145 is provided in the region of these ends, which web holds the guide tubes for the auxiliary actuating shafts apart at a spacing similar to that of the connecting pieces 136, 137 and 138.

A design which facilitates auxiliary actuation by manual shaft rotation when at least one of the electric motors 26, 34 and 40 has failed is principally shown in FIG. 21. In this embodiment, the component 132 is cut out to such an extent that the motor block 127 can be moved in the direction opposite arrow 131 and can be pulled downwardly toward the outside from the sectional rail 129, so that the ends of the flexible shafts 25, 33 and 39 become accessible. In this embodiment, the shafts 25, 33 and 39 are supported on a sheet metal angle 146 (see also FIG. 2) which, in turn, may be moved and locked on the T-shaped sectional rail 127. Also, in this embodiment, an arrangement of flexible guide tubes 133, 134 and 135 with transverse webs 145 and 145a at the forward and rearward ends can be provided as the auxiliary actuating shafts, as shown in FIG. 19. However, there may also be provided the advantageous modification that the connecting web 145 is formed with a hollow section member 147 which also slides onto the sectional rail 129 and can be locked at a suitable location thereon by means of a locking screw 148. Since the ends 149, 150 and 151 of the flexible shafts 25, 33 and 39 are external squares, a coupling member 152, 153 and 154 is provided at each of the ends of the flexible shafts which extend through the guide tubes 133, 134 and 135 as the auxiliary actuating shafts. The coupling members are non-rotatably connected to the external squares of these latter flexible shafts with the external squares of the first-mentioned flexible shafts.

Of course, the auxiliary actuating device provided on the hollow section member 147 can also be used for rotating the shafts 139, 140 and 141 of the electric motors if it is not required to remove the motor block 127 when one of these electric motors fails. In this case, the motor block 127 is moved back in the direction of the arrow 131 along the sectional rail 127 until the hollow section member 157 can also be slid onto the sectional rail 129, whereby the connection of the auxiliary actuating device with the motor block 127 is substantially facilitated because the flexible auxiliary actuating shafts can in these cases be easily threaded into the recessed squares of the motor shafts.

Moreover, it should be mentioned that, instead of an auxiliary actuating device as illustrated in the lower portion of FIGS. 9 and 21, it is of course also possible to use a single, flexible shaft 143 with a crank 144 or some other manual drive, or also a combination of two flexible shafts with appropriate guide tubes for auxiliary actuating shafts and connecting webs.

An especially simple approach for achieving auxiliary actuation is illustrated in the lower portion of FIG. 2, wherein individual openings are provided in the component 132 for permitting access to each of the motor shafts 139, 140 and 141 with a flexible auxiliary actuating shaft 155 which is provided with a hand crank 156 and which extends in guide tube 157 for the auxiliary actuating shaft.

Another auxiliary actuation mechanism illustrated in the lower portion of FIG. 2 involves a small servometer 158 which can be driven with a connecting piece 159 through the cigarette lighter socket of the motor vehicle. The servomotor 158 includes a square shaft 160 operable as the driving member which is conveniently used for a motor drive and which can be inserted into the recessed square of one of the motor shafts 139, 140 or 141.

Still another embodiment of an auxiliary actuation mechanism can be seen in the central portion of FIG. 2. In this case, a support plate 161 which is screwed to the motor block 127 and which is usually used for fixing or supporting the flexible shafts is connected to the motor block 127 through a quickly releasable connection 162 constructed for example as a so-called Destaco tightener. This makes it possible to release the angular support plate 161 from the motor block 127 in such a way that one or more defective gear units 23, 31 and/or 37 or motor parts become freely accessible. It is then possible to either arrange a provisional hand crank 144, 156 on the respective flexible shaft 25, 33 or 39, or an auxiliary actuating combination can be used, as is shown, for example, in FIG. 21. The servomotor 158 can also be used as the auxiliary drive.

It should be noted that connections other than the ones that are illustrated can also be used as quickly releasable connections 162; for example, a split or cotter pin/hole connection may provide a quickly releasable connection.

Finally, FIG. 1 shows an auxiliary actuation mechanism for the seat adjusting device 1 in which the gear units 23, 31 and 37 can be actuated directly. This is accomplished through the worm 24, 32, 38 provided at the input of each of these gear units and connected at one end to the flexible shaft 25, 33 or 39 coming from the assigned electric motor. The worm is provided at its other end with an additional input 163, 164 or 165 into which a flexible shaft 166 can be inserted which is driven either manually or by a servomotor. In this case, the worm 24, 32 and 38 need only be provided with a double recessed square and the corresponding gear unit must be modified accordingly. Also in this case, an auxiliary drive device can be optionally used with one, two or three flexible shafts and/or cranks and/or servomotors.

FIG. 1 only shows the connection of the worm 38 to a flexible shaft 166 for emergency or auxiliary drive of the gear unit 37 by means of a hand crank 167. Appropriate guide tubes 168 for auxiliary actuating shafts with funnel-shaped inlet openings 169 can be rigidly mounted and guided to each of the inlets 163, 164 and 165, so that, when an emergency or auxiliary actuation of the seat adjusting device becomes necessary, it may be simply accomplished by inserting into the respective funnel-shaped inlet opening an auxiliary actuating shaft 166 with hand crank 167 or servomotor, which may be conveniently contained in the set of tools of the motor vehicle.

While specific embodiments of the invention have been shown and described in detail to illustrate the application of the inventive principles, it will be understood that the invention may be embodied otherwise without departing from such principles.

What is claimed is:

1. A seat mounting arrangement for use in a motor vehicle having a travel direction and comprising a motor vehicle floor, a seat adjusting device having a lower frame arranged to be fastened to said motor vehicle floor at the front and rear thereof in the vehicle travel direction, wherein the improvement comprises that said motor vehicle floor includes a front cross member and a rear cross member, said lower frame includes a pair of laterally spaced struts extending between the front and rear thereof, each said strut having a lug at one end thereof, one of said cross members having a plate secured thereto corresponding to each said lug and forming a wedge-shaped recess, each said lug on said struts arranged to engage in one of said wedge-shaped recesses, and a threaded connecting member located at the opposite ends of said struts from said lugs for securing said struts to the other said cross member.

2. A seat mounting mechanism for use in a motor vehicle having a travel direction and comprising a motor vehicle floor, a seat adjusting device having a lower frame arranged to be fastened to said motor vehicle floor at the front and rear thereof in the vehicle travel direction, wherein the improvement comprises that said motor vehicle floor includes a front cross member and a rear cross member, said lower frame comprises a pair of laterally spaced longitudinally extending struts extending between the front and rear of said lower frame, each said longitudinal strut has a hook at one end thereof with an opening formed by the hook facing toward the opposite end of said strut, the one of said front and rear cross member adjacent said hook having an opening therethrough and said opening in said cross members having a lateral edge, said hook arranged to fit into said opening in the ajacent said cross member and to engage said lateral edge, and a threaded member located at the opposite end of said strut from said hood and arranged to connect said strut to the other one of said front and rear cross members.

3. A mounting mechanism for attaching to the floor of a motor vehicle having a travel direction a vehicle seat assembly including a seat shell, an upper seat frame, a lower seat frame, and seat adjusting device for adjustably locating said upper seat frame relative to said lower seat frame, in the travel direction of the motor vehicle said seat assembly having a forward end, a rearward end each extending transversely of the travel direction and a left side, and a right side, with said left and right sides extending in the travel direction, said mounting mechanism comprising:

lockable engaging connection means interposed between said lower seat frame and said vehicle floor and also between said seat shell and said upper seat frame on both said left and said right sides of said seat assembly and at at least one of said forward end or said rearward end thereof for connecting, respectively, said lower seat frame to said vehicle floor and said seat shell to said upper seat frame;

said lockable engaging connection means including parts arranged to be brought into wedged engagement with each other for providing a locking connection in the travel direction of said seat assembly as well as in the vertical direction and in the horizontal direction transverse of the travel direction thereof; and fastening connection means disposed in spaced relation from parts in the travel direction and operating in the travel direction of said seat assembly in cooperation with said lockable engaging connection means between said lower seat frame and said motor vehicle floor as well as between said seat shell and said upper seat frame for effecting said wedged engagement of said parts of said lockable engaging connection means.

4. An arrangement according to claim 3 wherein said fastening connection means comprise screw connection means.

5. An arrangement according to claim 3 wherein said lockable engaging connection means are bolt/keyhole connection means comprising at least one bolt including a bolt head and a bolt shaft affixed to one of two parts to be fastened together and at least one keyhole slot arranged on the other of said two parts, said keyhole slot comprising a generally circular portion having a diameter larger than the diameter of said bolt head, said circular portion being contiguous with a wedge-shaped portion of said keyhole slot, said wedge-shaped portion being dimensioned with its largest width portion larger than and with its smallest width portion smaller than said bolt shaft.

6. An arrangement according to claim 5, wherein the depth of said wedge-shaped portion continuously increases in the direction of the wedge, and wherein its largest depth is somewhat larger and its smallest depth is somewhat smaller than the clear width between said bolt head and said bolt base.

7. An arrangement according to claim 5 wherein a plurality of bolt/keyhole connection means are provided and wherein said bolts comprise axes which are arranged to extend transversely to each other.

8. An arrangement according to claim 3 wherein said lockable engaging connection means are lug/plate connection means comprising at least one lug affixed at one of two parts to be fastened together, said lug being adapted to be slid under at least one plate provided on the other of said two parts to be fastened together.

9. An arrangement according to claim 8, wherein said plate includes side members which limit the lateral play of said lug.

10. An arrangement according to claim 9, wherein said plate and said lug are constructed so as to narrow in the shape of a wedge in the direction of insertion of said lug into said plate so that the lateral edges of said lug are wedged with said side members of said plate.

11. An arrangement according to claims 8, 9 or 10, wherein said plate together with a part on which said plate is mounted defines a wedge-shaped recess viewed in longitudinal section and wherein said lug is constructed so as to narrow in the shape of a wedge viewed in longitudinal section in the direction of its insertion into said plate so that the upper side of said lug is wedged with said plate.

12. An arrangement according to claims 8, 9 or 10, wherein said lug/plate connection means comprise a plurality of lug/plate connections each having lugs which extend perpendicularly to each other.

13. An arrangement according to claim 3 wherein said lockable engaging connection means is constructed as a hook/hook engagement connection means comprising at least one hook which is provided in one of two parts to be connected, and a hook engagement member provided in the other of said two parts to be connected.

14. An arrangement according to claim 13 wherein said hook is formed by a bent end of said one part and said hook engagement member is formed by an edge of an opening provided in said other part.

15. An arrangement according to claims 13 or 12, wherein a plurality of hooks and hook engagement members are provided with linear contact between said hooks and said hook engagement members with the lines of said contact extending perpendicularly to each other.

16. An arrangement according to claims 3, wherein said lockable engaging connection means is constructed as wedge shoe/wedge rail connection means comprising at least one wedge shoe which is provided on one of two parts to be fastened together, and at least one wedge rail which is provided on the other of said two parts to be fastened together and which can be slid into said wedge shoe to be wedged therein.

17. An arrangement according to claim 16, wherein said wedge shoe has a T-shaped sectional profile and said wedge rail has a C-shaped sectional profile and wherein side edges of two side flanges of said T-shaped profile of said wedge shoe and inner side edges of said wedge rail which are brought into engagement with said side edges of said wedge shoe extend in the shape of a wedge relative to each other in the longitudinal direction of their profiles.

18. An arrangement according to claim 17, wherein a plurality of wedge shoe/wedge rail connection means are provided, and wherein planes in which two flanges of said T-shaped profile are located extend perpendicularly to each other.

19. An arrangement according to claim 3, wherein said lockable engaging connection means is constructed as bolt/blind slot connection means which comprises a slot which is closed in its longitudinal direction at least at one end and is provided in one of two parts to be connected together, and a bolt which can be locked with said end of said slot.

20. An arrangement according to claim 19, wherein said fastening connection means comprises a screw connection for locking said bolt.

21. An arrangement according to claim 19, wherein said lockable engaging connection means includes a lockable stirrup for locking said bolt.

22. An arrangement according to claim 21, wherein said slot is provided in a lug which narrows in the shape of a wedge in its longitudinal directional from the edge of said lug, wherein said stirrup is arranged to be pivoted parallel to said lug and is provided with a slot in which said bolt can be inserted in a first position of said stirrup and in which it can be moved during the transition into a second position of said stirrup to a narrow end of said slot provided in said lug, and wherein at least that part of said slot arranged in said stirrup in which said bolt is then located, extends transversely to said slot provided in said lug, said stirrup being locked at least in its second position.

23. An arrangement according to claim 22, wherein an axle about which said stirrup can be pivoted is arranged diagonally above said bolt when said bolt is in its locking position.

24. An arrangement according to claims 22 or 23, wherein said slot in said lug extends to the edge of said lug.

25. An arrangement according to claims 22 or 23, wherein said slot of said stirrup is closed in the plane of said stirrup extending perpendicularly to the axis of said bolt and is formed as a longitudinal slot adapted to have said bolt engaged therewith and with an adjacent transverse slot for receiving said bolt in the locking position, and wherein, in the region of said longitudinal slot, said stirrup is bent in the axial direction of said bolt by slightly more than the height of said bolt head plus the thickness of said stirrup so that said bolt head can be inserted into said slot of said stirrup in a plane which is parallel to the plane of said stirrup.

26. An arrangement according to claim 3, wherein said screw connection means comprise a self-centering screw connection.

27. An arrangement according to claim 26, wherein said self-centering screw connection has two interengaging, conical bushings operating as the device for self-centering thereof.

28. An arrangement according to claim 3 wherein said seat adjusting device is constructed for connection thereof with an auxiliary actuating device to enable manual adjustment of said seat adjusting device in the case of failure of elements of said seat adjusting device such as electric motor means, gear means and flexible shaft means which connect said gear means to said electric motor means.

29. An arrangement according to claim 28, wherein said electric motor means include shafts which are accessible through the housing thereof from the outside at both ends of said electric motor means.

30. An arrangement according to claim 29, wherein said electric motor means are provided in the interior of said seat adjusting device and wherein said shafts are accessible at their free ends for an auxiliary actuating shaft through at least one part of said seat adjusting device covering said ends.

31. An arrangement according to claim 29, wherein said electric motor means is formed as a motor block unit slidable along a rail at least to such an extent that the free ends of the shafts thereof are accessible through at least one auxiliary actuating shaft and that said electric motor means is lockable on said rail at respective shifting positions.

32. An arrangement according to claim 31, wherein said electric motor means is arranged on a hollow section member which is slidable on a T-shaped sectional rail.

33. An arrangement according to claims 31 or 32, wherein said electric motor means is removable from said seat adjusting device through a free end of said rail by movement along said rail.

34. An arrangement according to claim 33 wherein said electric motor means is slidable along said rail in the longitudinal direction of the shafts of said electric motor means.

35. An arrangement according to claim 34, wherein said auxiliary actuating device comprises a connecting web on which there are arranged at least one auxiliary actuating guide member for auxiliary actuating shafts which can be slid onto and locked on said rail through a hollow section member mounted on said connecting web, wherein at least one of said auxiliary actuating shafts and said guide member can be arranged in a desired position relative to said shafts of said electric motor means and relative to the ends of said flexible shafts which lead to said gear means of said seat adjusting device, said auxiliary actuating shafts being supported in auxiliary shaft support means to be normally coupled to said electric motor means so that they can be coupled to said shafts of said electric motor means essentially by positioning of said connecting web along said rail.

36. An arrangement according to claim 35, wherein said auxiliary shaft support means are movable and lockable along said rail.

37. An arrangement according to claim 35, wherein said auxiliary shaft support means comprise a support plate arranged on said electric motor means by means of a quickly releasable connection.

38. An arrangement according to claim 35 wherein said auxiliary shaft support means comprise a sheet metal angle member.

39. An arrangement according to claim 28 wherein in addition to an input for connection with said electric motor means, the input shafts of said gear means are provided as shafts of a worm provided at the input side in each unit of said gear means and are provided with an additional input for the connection of a flexible auxiliary actuating shaft.

40. An arrangement according to claim 39, further comprising guide tubes for said auxiliary actuating shafts extending from said additional inputs to the outside and provided at this location with a funnel-shaped input opening.

41. An arrangement according to claim 28 wherein said auxiliary actuating device includes auxiliary actuating shafts comprising external connection means through which they can be connected to complementary connection means in said shafts of said electric motor means through a coupling member.

42. An arrangement according to claim 28 wherein said auxiliary actuating device includes auxiliary actuating shafts comprising external connection means through which they can be connected to said gear means.

43. An arrangement according to claim 28 wherein said auxiliary actuating device includes auxiliary actuating shafts comprising a coupling member for connection thereof to said flexible shafts which are provided between said electric motor means and said gear units.

44. An arrangement according to claim 28, wherein said auxiliary actuating device comprises servomotor means provided as the drive for said auxiliary actuating device, said servomotor means being adapted to be connected to the cigarette lighter socket of a motor vehicle.

45. A mounting mechanism for attaching to the floor of a motor vehicle a vehicle seat assembly including a seat shell, an upper seat frame, a lower seat frame, and seat adjusting device for adjustably locating said upper seat frame relative to said lower seat frame, said seat assembly having a forward end, a rearward end, a left side, and a right side, said mounting mechanism comprising:

lockable engaging connection means interposed between said lower seat frame and said vehicle floor and also between said seat shell and said upper seat frame on both said left and said right sides of said seat assembly and at at least one of said forward end or said rearward end thereof for connecting, respectively, said lower seat frame to said vehicle floor and said seat shell to said upper seat frame;

said lockable engaging connection means being configured with parts arranged to be brought into wedged engagement with each other to provide a locking connection in the longitudinal direction of said seat assembly as well as in the vertical direction and in the transverse direction thereof; and fastening connection means operating in the longitudinal direction of said seat assembly in cooperation with said lockable engaging connection means between said lower seat frame and said motor vehicle floor as well as between said seat shell and said upper seat frame to effect said wedged engagement of said parts of said lockable engaging connection means, said lockable engaging connection means is constructed as bolt/blind slot connection means which comprises a slot which is closed in its longitudinal direction at least at one end and is provided in one of two parts to be connected together, and a bolt which can be locked with said end of said slot, a screw connection is provided for locking said bolt, said slot is provided in a lug and is closed in the plane of said lug, wherein said slot consists of a first slot portion for engagement with said bolt and an adjacent extension for receiving said bolt in the locked position, and wherein in the region of said first slot portion, said lug is bent in the axial direction of said bolt by slightly more than the height of said bolt head plus the thickness of said lug, so that said bolt head can slide into said slot in a plane which is parallel to the plane of said lug.

* * * * *